United States Patent
Steiner

(10) Patent No.: US 8,825,726 B2
(45) Date of Patent: Sep. 2, 2014

(54) METHOD OF GENERATING STATISTICAL OPINION DATA

(75) Inventor: Christian Steiner, Merano (IT)

(73) Assignee: Zillian SA, Lugano (CH)

(*) Notice: Subject to any disclaimer, the term of this patent is extended or adjusted under 35 U.S.C. 154(b) by 386 days.

(21) Appl. No.: 13/411,202

(22) Filed: Mar. 2, 2012

(65) Prior Publication Data

US 2012/0233229 A1    Sep. 13, 2012

(30) Foreign Application Priority Data

Mar. 3, 2011    (GB) .................................. 1103673.8

(51) Int. Cl.
*G06F 17/18* (2006.01)
*G06Q 30/02* (2012.01)
*G06Q 50/20* (2012.01)

(52) U.S. Cl.
CPC ............ *G06Q 30/02* (2013.01); *G06Q 30/0201* (2013.01); *G06Q 50/20* (2013.01); *G06Q 30/0202* (2013.01)
USPC .......................................................... 708/134

(58) Field of Classification Search
None
See application file for complete search history.

(56) References Cited

U.S. PATENT DOCUMENTS

| | | | | |
|---|---|---|---|---|
| 5,371,673 | A * | 12/1994 | Fan .................................... | 704/1 |
| 2006/0062363 | A1* | 3/2006 | Albrett ...................... | 379/101.01 |
| 2010/0153983 | A1* | 6/2010 | Philmon et al. .................. | 725/13 |
| 2011/0289078 | A1* | 11/2011 | Woodard et al. .............. | 707/723 |
| 2012/0233229 | A1* | 9/2012 | Steiner .......................... | 708/132 |

* cited by examiner

*Primary Examiner* — David H Malzhan
(74) *Attorney, Agent, or Firm* — Olson & Cepuritis, Ltd.

(57) ABSTRACT

A system is provided for detecting statistical variations and public opinion. The system comprises a respondent interface subsystem for capturing respective opinion values of a set of respondents in relation to a subject matter, said opinion values having respective validity periods associated therewith. The system further includes a database subsystem for storing the respective opinion values corresponding to each respondent and to said subject matter. The system further includes a statistical processing subsystem for calculating successive values of a collected opinion value by selecting respective subsets of said respective user opinion values according to said respective validity periods and calculating said successive values of a collective opinion value over said corresponding subset.

14 Claims, 10 Drawing Sheets

| Subject ID | Respondent ID | Latest Position | Entry Time | Expiry Time |
|---|---|---|---|---|
| 2033 | 1 | 32 | 2010-06-21 14:35:03 | 2010-07-11 14:35:03 |
| 2033 | 2 | 76 | 2010-05-12 11:55:42 | 2010-06-01 11:55:42 |
| 2033 | 3 | 02 | 2010-05-30 17:59:12 | 2010-06-19 17:59:12 |
| 2033 | 4 | 98 | 2010-06-02 08:37:43 | 2010-06-22 08:37:43 |
| 2033 | 5 | 83 | 2010-05-07 19:42:24 | 2010-05-27 19:42:24 |
| 2033 | 6 | 79 | 2010-05-17 22:10:09 | 2010-06-06 22:10:09 |
| 2033 | 7 | 65 | 2010-05-25 11:41:17 | 2010-06-14 11:41:17 |
| 2033 | 8 | 24 | 2010-05-18 12:09:58 | 2010-06-07 12:09:58 |
| 2033 | 9 | 38 | 2010-06-03 18:07:33 | 2010-06-23 18:07:33 |
| ... | ... | ... | ... | ... |

| Subject ID | Respondent ID | Latest Position | Entry Time | Expiry Time |
|---|---|---|---|---|
| 2033 | 1 | 32 | 2010-06-21 14:35:03 | 2010-07-11 14:35:03 |
| 2033 | 2 | 76 | 2010-05-12 11:55:42 | 2010-06-01 11:55:42 |
| 2033 | 3 | 02 | 2010-05-30 17:59:12 | 2010-06-19 17:59:12 |
| 2033 | 4 | 98 | 2010-06-02 08:37:43 | 2010-06-22 08:37:43 |
| 2033 | 5 | 83 | 2010-05-07 19:42:24 | 2010-05-27 19:42:24 |
| 2033 | 6 | 79 | 2010-05-17 22:10:09 | 2010-06-06 22:10:09 |
| 2033 | 7 | 65 | 2010-05-25 11:41:17 | 2010-06-14 11:41:17 |
| 2033 | 8 | 24 | 2010-05-18 12:09:58 | 2010-06-07 12:09:58 |
| 2033 | 9 | 38 | 2010-06-03 18:07:33 | 2010-06-23 18:07:33 |
| ⋮ | ⋮ | ⋮ | ⋮ | ⋮ |

Fig. 3

METHOD OF GENERATING STATISTICAL OPINION DATA

CROSS-REFERNCE TO RELATED APPLICATIONS

This application claims priority to GB 1103673.8 filed on Mar. 3, 2011, the entire disclosure of which is incorporated herein by reference.

BACKGROUND

An "opinion" can represent a user preference, view, assessment, intention or attitude with respect to a particular subject matter. Generating opinion data is useful in a wide range of industries. Often, the opinions of a relatively small group of individuals can be used to make judgments about the opinions of a wider population. For example a survey may be conducted using a relatively small group of individuals about their opinions with respect to a range of products and judgments can be made as to how such products might be developed or discontinued over time for a wider population based on the responses of those individuals. Tracking public opinion about matters of general interest is of paramount importance in several disciplines, including marketing, social action and politics.

Surveys are conducted periodically in order to track the public's attitude that may modify policy decisions in the case of surveys regarding public matters, or market strategies in the case of brands and products. For example, surveys are continually conducted on a daily basis in the United States by companies like Gallup, Rasmussen and others to track the opinion of public regarding well known characters such as politicians, TV stars, sport champions, etc.

Surveys are conventionally conducted by asking questions to a randomly selected set of respondents belonging to a population. The questions are called stimuli while the answers to each respective stimuli are counted and weighted to produce meaningful statistical figures regarding the preferences, views, choices, desires, etc. of the population as a whole. The term "user selections" is used throughout this document to refer to such type of user data input in the context of statistical opinion surveys.

Such surveys produce very useful information that is used then for various purposes, such as modelling a political campaign or defining the contents of a particular broadcast. However, the accuracy of the data produced by any survey is limited by the number of respondents participating in the survey, which is the primary variable in determining the cost of such surveys.

For example, Gallup in the US produces a daily survey for tracking the public's approval rate for the president of the United States which involves approximately 1,500 respondents and its results are averaged over three days in order to smoothen out the inevitable statistical noise produced by the sampling process. While the data produced by that type of survey is critical to understand the long-term trends of the measured variable, the amount of information that can be extracted from such a survey regarding short term variations in that same variable is severely impaired by statistical noise. This noise could be overcome according to conventional approaches only by multiplying by a large factor the costs associated to the survey. This long-term constraint on conventional survey approaches regarding that type of data makes it impossible to correlate eventual drifts in the ratings with events in the news, given that no meaningful short-term data can be extracted from the surveys. The availability of very-short-term variation data would make it possible to record, measure and assess fluctuations in user selection data and its relationship with short term changes in a particular situation or set of circumstances. For example, it would make it possible to correlate swings in public opinion regarding events in the news and therefore to extract insights on how the public is assessing specific decisions made by policy makers and other individuals having a high responsibility positions or otherwise high profiles. The generation of such type of data is unfeasible with conventional surveying systems because it would require operating several successive surveys within a single day involving a significant number of individuals in order to minimize sampling errors to a level compatible with the need. This could not reasonably happen in practice. Therefore, there is a need for a system capable of detecting short-term variations in selection data provided by users, in particular relating to public attitudes and opinion, in quasi-real time for enabling a more correct interpretation of such data.

An invention is set out in the claims.

According to an aspect there is provided a method of generating statistical data representing opinion of a population comprising providing an interface for provision by a user of a data input representing said user's selection, storing data inputs provided by a plurality of users representing their respective user selections, assigning a validity time period to each data input, providing an interface for provision by a user of an update to a previous data input representing said user's selection, updating the stored data to include updates provided by one or more of the plurality of users, filtering out any such input data whose validity period has expired, aggregating the remaining stored input data for generating a value of one or more opinion indicators, and repeating said aggregating and determining steps to update the value of the at least one index over time.

Each data input provided by a user bears an input time and a validity period associated therewith. The input time and the validity period of a data input is determinative in whether a particular data input is included in the aggregation process for generating a respective instance of the opinion indicators. The aggregation process is repeated over time, either on a periodic basis or on a user controllable basis, and the succession of values of opinion indicators is used as a quasi-continuous indication of opinion variations related to the population or group to which respondents belong. If universe information is available, individual data inputs may be weighted before they are included in the aggregation to provide a better projection of the statistical data generated therefrom. The population represented may be determined based on a political or geographic border or any other suitable boundary, including interest groups or sets of individuals defined by any clustering factor.

The user selection may comprise any of: an opinion, a user preference, a view, an assessment, an intention or an attitude with respect to a particular subject matter.

The opinion indicator may be an index

The method may include generating a substantially continuous series of values of said index. Said generation of successive values of said opinion index may happen in quasi-real time.

The step of filtering out any input data whose validity period has expired enables determination of a set of valid data inputs according to the respective associated validity time periods of the inputs. It may include determining, at a point in time, whether the validity period associated with each of a plurality of data inputs has expired and excluding any data inputs for which the associated validity period has expired.

The afore-mentioned index may represent opinion data for a population, wherein said population comprises a relatively large number of individuals as compared to the number of users from whom data inputs have been used for the aggregation. The index may represent any of: agreement or disagreement with a statement; a selection of an option from a plurality of options; a prediction; an approval or disapproval of an individual, body statement or policy; a request; an expectation; or a requirement. It can take the form of any of: a numerical value; a percentage value; a Boolean choice; an alphabetical indicator; or a scaled grading.

The method may include the step, before the aggregation step, of applying a weighting factor to the value of at least one of said data inputs. Furthermore, the length of the validity time period for a given data input may be determined by any of: the type of related subject matter; the input time of said data input, the identity of the user providing said data input, whether the data input comprises initial data representing a user selection or an update to previously-input data representing a user selection, a predetermined time limit for provision of data inputs, an arbitrary value entered by the user, or the nature or magnitude of the selection represented by the data input.

The method may include the step of determining a relationship between a value of an index and at least one event that has occurred within a predetermined time period respect to the time said variation is observed. Said relationship may be determined based on a change in the value of said at least one index over time. The method may include estimating at least a future value of said index. The step of estimating a future value of said index may comprise predictions of: a value of the index at a future point in time; a time at which a value of the index will fall below a predetermined threshold, whether a value of the index will be less than or greater than a reference value at a future point in time.

A user may be prompted to update a data input representing said user's selection.

Data inputs provided by the users representing their respective selections may be provided using a substantially continuous scale between upper and lower thresholds. That substantially continuous scale may be represented graphically to the user and the user can move a pointer or other actuator on the scale to indicate their user selection According to an aspect a method of generating statistical data representing opinion is provided wherein that method further includes a step of analyzing variations in the succession of values of opinion indicators and determining a relationship between occurrence of an event and any such variation observed in such values.

According to another aspect a method is provided for creating a system for generating statistical data representing user selection and/or opinion, the method comprising providing an interface for provision by a user of a data input representing said user's selections, providing an interface for provision by a user of an update to a previous data input representing said user's selections, providing a memory for storing data inputs and/or data updates provided by one or more of the plurality of users and providing a processor for aggregating the stored data and generating at least one indication of opinion using said aggregated data. The aggregation may be made according to a validity period assigned to a plurality of data inputs and a data update. The aggregation step may be repeated.

According to an aspect a system is provided said system comprising a memory and a processor and being arranged to perform a method as described herein. The system may also comprise one or more user interfaces.

According to an aspect a computer readable medium is provided having computer executable instructions adapted to cause a system to perform a method substantially as described herein.

According to an aspect there is provided a system for detecting statistical variations in public opinion comprising: a Respondent Interface Subsystem for capturing respective opinion values or positions of a set of respondents in relation to a subject matter, said positions having respective validity periods associated therewith; a Database Subsystem for storing said respective positions corresponding to each respondent and to said subject matter; a Statistical Processing Subsystem for calculating successive values of a Collective Opinion Value by selecting respective subsets of said respective positions according to said respective validity periods and calculating said successive values of a Collective Opinion Value over said corresponding subsets.

Said Respondent Interface Subsystem may be accessed at any given time by said respondents for updating their respective positions. Said Statistical Processing Subsystem may filter any such valid respective position from a respective subset if any newer respective position exists in said respective subset and from the same respondent.

Said Respondent Interface Subsystem may comprise an electronic graphic representation including a description of said subject matter and an input area through which said respondents may input their respective positions to said Database Subsystem.

The respective validity periods of data inputs may be predefined according to observations made on opinion persistence times. The respective validity periods may be set by the respective respondent.

Said Statistical Processing Subsystem may include a weighting engine for correcting eventual imbalances in the set of respondents of respondents according to universe data.

FIGURES

Embodiments and examples will now be described with respect to the figures of which:

FIG. 3 shows an example of a record of user responses on a particular subject using the system of FIG. 1;

OVERVIEW

In overview, a method and system are provided for generating opinion data based on the opinions of a subset of a population or group. It has been recognized herein that a person's opinion has an inherent persistence time. That is, a person will hold a particular opinion for at least a certain amount of time and that opinion tends to stay unvaried under a certain set of circumstances. The present method and system provide an intelligent link between the inherent persistence time of opinions and the characteristics of data which can be input into a data processing system. By filtering and processing data inputs based on, inter alia, validity periods assigned to those respective data inputs, the method and system can realistically simulate the nature of public opinion on a range of subject matters, including how they can change over time. Furthermore, by aggregating data inputs which represent the opinions of a relatively small group of people, including any changes or updates to those opinions, the method and system is capable of providing a reliable indication of public opinion for a relatively large group of people in quasi-real time, i.e. substantially in real time.

Figure 1:
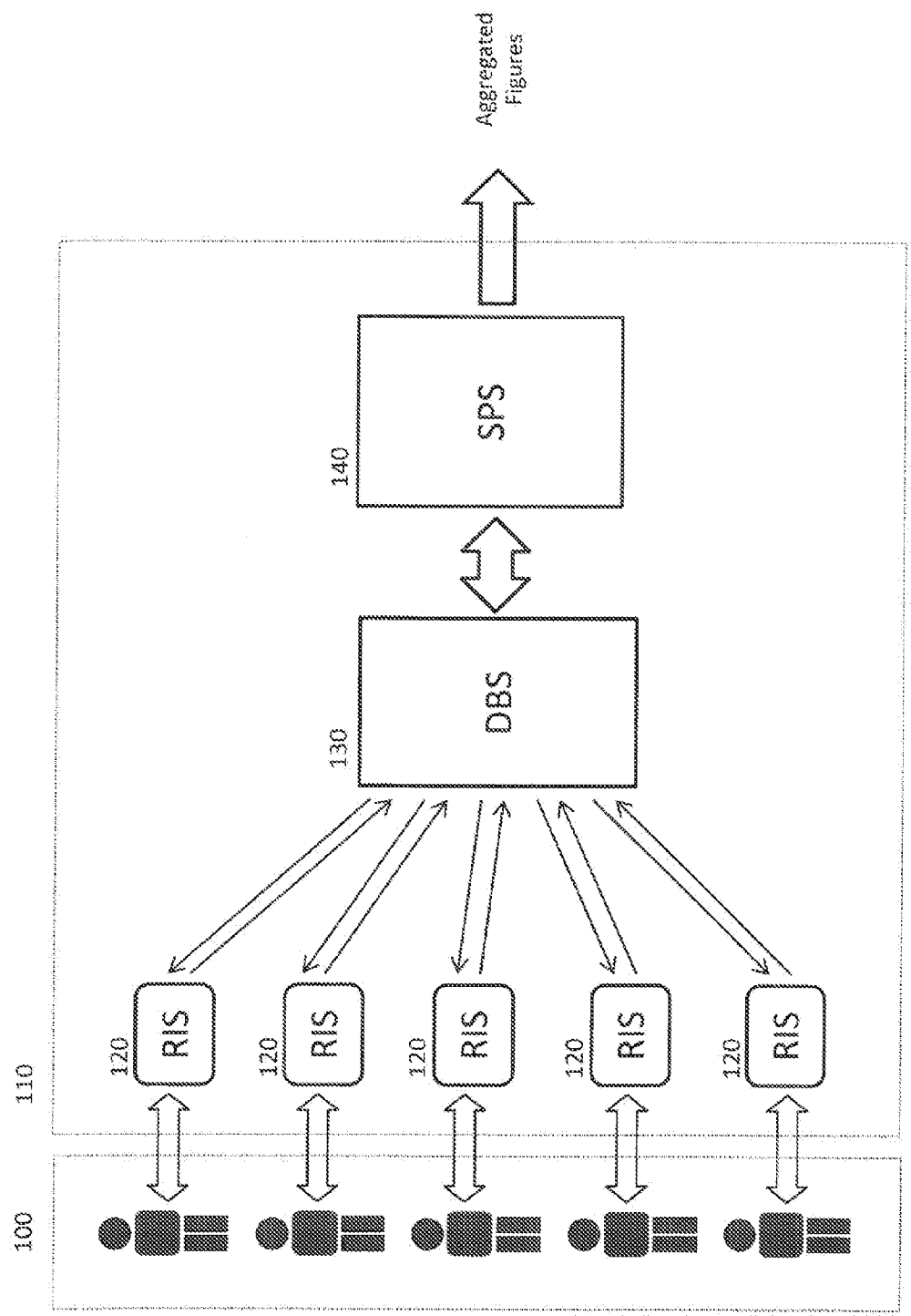
FIG. 1 is a schematic view of a survey system according to an embodiment.

FIG. 1 shows an embodiment of the system described in detail here below. It comprises a plurality of user interfaces, each referred to herein as a Respondent Interface Subsystem 120 (hereinafter "RIS") that a panel of voluntary respondents 100 can use to access a Database Subsystem 130 (hereinafter "DBS") programmed to store information about the respondents in separate respective compartments. The system further comprises a Statistical Projection Subsystem 140 (hereinafter "SPS") capable of realizing statistical calculations a repetitive basis for generating aggregated figures representing public opinions toward predefined matters of interest.

The RIS is implemented in the embodiment shown in several instances so as to enable the easiest and most immediate possible access by respondents to their respective records in the DBS through an appropriate data transmission network e.g. Internet, GSM, etc. and through the use of widely available interfaces such as web browsers or smart phones.

The DBS is programmed to hold in the database respective numerical values (derived from user selections using a respective RIS instance) representing the associated respondents' attitudes toward a plurality of matters of interest to the population to which the respondents belong or to any given group of individuals (hereinafter "subject matters"). Each one of such numerical values (hereinafter "opinion values") is a statement of position of the corresponding respondent preferably in the form of a graded scale representing various degrees of agreement, affinity, expectation, and so on in relation to the corresponding subject matter. The graded scale may be a numeric scale or any other appropriate type of scale.

By way of example, an opinion value may represent a level of agreement or disagreement with a proposed premise, an assessment about a theoretical variable such as general well-being or an assessment about likelihood of a potential future event such as a market event or political event. In the examples described in the present application the selection data input by the user is largely opinion data, potentially relating to political or other media related events. However any other type of data may be input by the user using a system such as that shown in FIG. 1 to express a user intention or preference. For example a user may input a numerical value indicating financial information, demographic information, location, time, for example a time or period at or after which they intend or expect something to happen, or they may input a numerical value representing a request or desideratum. The input values need not be numerical. They could instead be a selection of one of a variety of available options or choices, including Boolean choices (e.g. "yes" or "no").

Figure 2:
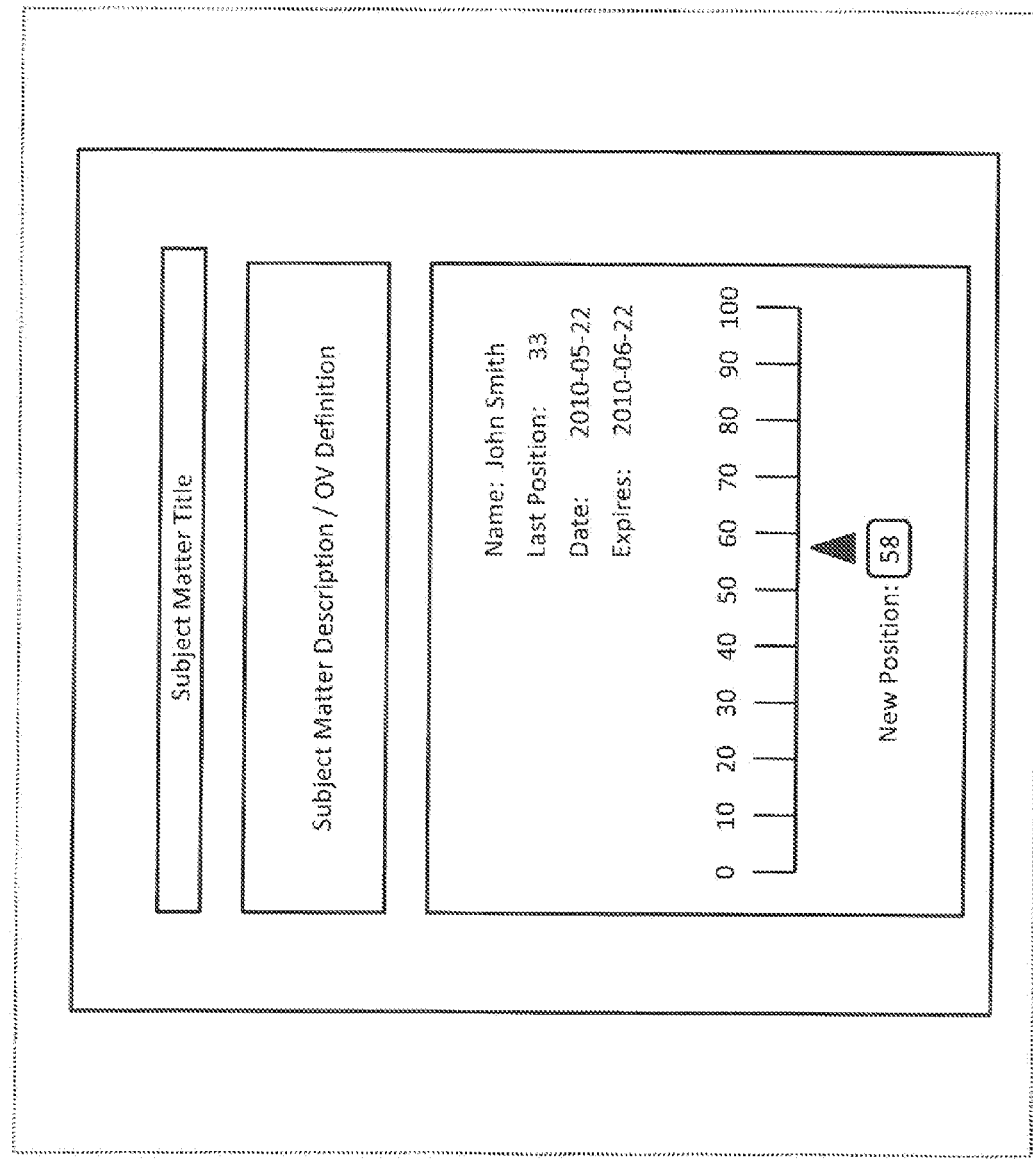
FIG. 2 shows a possible arrangement of elements of the RIS interface shown in FIG. 1.

FIG. 2 depicts a possible arrangement for some of the elements of the RIS graphical interface, comprising a title for the related subject matter. An example of such a title that may be of public interest is "Need for further regulation of financial institutions". The RIS may further comprise an explanation or definition of the opinion value associated to the subject matter. For example it may state "From 0 to 100, please rate your level of agreement with the premise as stated in the above title". Preferably, the RIS also comprises information about the last position stated by the respondent if any, including the respondent's identification, date of last selection and expected expiry time. The RIS interface should include as well a means to allow the entry of an opinion value (i.e. selection), preferably though some graphical representation as depicted in FIG. 2. Even though a graphical interface is largely preferred as a means for data entry by respondents, other type of interfaces can be used, like for example a simple text-based email interface or GSM SMS which is a well known mobile phone standard for short messages.

Selections or opinion values as input from time to time by respondents are stored in respective compartments in the DBS, together with a time stamp of the latest entry and a corresponding expiry time, as exemplified by FIG. 3. Opinion values can be modified by respondents discretionally at any time by simply logging in the system 110 through the use of the respective RIS. All opinion values input bear a pre-assigned validity period and all records of opinion values are deemed valid (i.e. usable for calculations) only within such validity period, after which the respective record expires unless the respondent has refreshed his/her position on time, stating it explicitly through the RIS.

The SPS (140) is programmed to repeatedly calculate a collective opinion value (hereinafter "COV") which is used as a general opinion index representing the aggregated position of all participants respect to a given subject matter, at each given point in time. The COV is preferably weighted so that it can be properly projected onto a whole group or population using any appropriate statistical projection technique, such as the ones used for other types of research activities. The SPS calculates a succession of COV on a repetitive, short-term, preferably periodical basis so as to produce a substantially continuous moving index evidencing -in quasi-real time- any variations in the public's attitude respect to the corresponding subject matter.

By way of example, a subject matter may be the general sentiment of the public respect to a specific way of handling a given category of public affairs, for example policy response to an economic crisis, or a general judgment of approval or disapproval of a certain administration's performance. Other types of subject matters may include matters that may be of interest to a smaller group of individuals. Examples of such groups may include fans of a given celebrity, members of a professional association, etc.

DETAILED DESCRIPTION

As will be understood further from the description of particular embodiments below, the system and associated methods described herein rely on the recognition that the opinions (as expressed by individuals) tend to stay substantially unchanged until some new input or circumstance might produce a shift in such opinions by modifying the interpretation frame though which the subject matter is assessed and understood by respondents. In other words, opinions and attitudes tend to have an inherent persistence time during which they tend to stay unmodified until a relevant and significant new input is provided. This general characteristic of opinions can be verified by observation on daily experience and is consistent with the wide body of literature describing the psychological/cognitive processes governing opinion dynamics.

The present methods and system take advantage of such persistent characteristic of opinions in order to produce statistical data about variations in such opinions for a whole group or population, requiring significantly fewer resources than what would be needed to obtain comparable results through conventional methods such as repetitive polling. As respondents get exposed to new information, for example through mass communication systems such as radio, the internet or television, they are encouraged by the present methods and system to access their respective records in the DBS through the RIS to state or modify their position respect to the relevant subject matter, if it has changed indeed.

Because selections or opinion values are stored and re-used in successive assessment cycles during their respective validity periods, the present system acts as a sampling mechanism for directly estimating variations in opinion. As opposed to sensing successive absolute values of the same quantities which would require costly repetitive polling schemes, the system is structurally capable of capturing statistical variations in such values because the bulk of the output value is produced by numbers that are already stored in the DBS memory. Those stored numbers are assumed to represent the current opinion of all users that have not restated their selections and are used as anchor values from which drifts are measured. Thus, instead of requiring successive repetitive assessments of the aggregated value as a whole, the method of the invention focuses on capturing variations of such a value. Because only the new or restated positions as input or re-input by users have a role in producing such variation estimates, the method is capable of significantly reducing the impact of statistical noise associated with repetitive sampling and enables, at the same time, the generation of statistical data in a continuous fashion, and in quasi-real time if desired.

Because the present methods and system enable the capturing of subtle changes in the aggregated public's attitude or opinion as it happens in the population, a useful cause-effect correlation can be easily established in most cases between news events and public opinion swings, which are not detectable using conventional opinion polls at any comparable cost. The latency in availability of any new figures is governed only by inherent reaction times observable in average respondents and by the time needed by the statistical subsystem to recalculate all relevant new figures. Moreover, the present methods and system minimizes the amount of effort required to maintain a running estimate of public opinion on any given subject matter, limiting any actions required from respondents only to the set of users that believe their positions need to be restated, as a consequence of news or relevant developments.

SYSTEM EXAMPLE

A particular embodiment of a system realizing the method is depicted in FIG. 1. As shown therein, three essential elements are included in the system 110 as follows:
1) A plurality of instances of a Respondent Interface Subsystem 120 that serves, among other uses, as an input/output interface for respondents to provide/update their positions on at least one subject matter.
2) A Database Subsystem 130 that serves, among other uses, as a repository where opinion values corresponding to each respondent and each subject matter are stored.
3) A Statistical Processing Subsystem 140 that serves, among other uses, as a computation device for calculating successive values of a Collective Opinion Value representing the general opinion of a larger group or population varying over a given real-time scale.

The RIS can be accessed via an appropriate data network such as the internet or GSM. In order to start using the system for the first time, a user may be required to register so that information relating to them can be stored in a suitable memory such as the database subsystem 130. Stored information may include the user's name, contact information such as an email address or telephone number, and demographic information such as the age and gender of the user or where they live. The user may be required to set up a respondent ID to which their user information will be assigned when it is stored in the database subsystem 130. Any selection or opinion data that the user subsequently inputs by way of response to a particular subject matter for which the system is conducting a survey will be assigned to that same respondent ID for storage. After registration or other input of their respondent data to the system, users can then decide to respond on particular subject matters providing an appropriate selection that represents their positions on each subject matter.

Preferably respondents can freely access their respective records in the DBS at any time via the RIS in order to update or restate their individual positions, each of which has a respective validity period. Because respondents can freely and easily access their records at any time, any opinion value can be considered representative of the respective user's position until the respondent opts to access the record again to update it, or until the data input expires at the end of its validity period, whatever comes first. The natural persistence time of opinions combined with the capability of modifying registered values by respondents enable the production of a moving opinion aggregated figure which is structurally sensitive to slight variations on the public's attitude towards a given subject matter.

Figure 4:
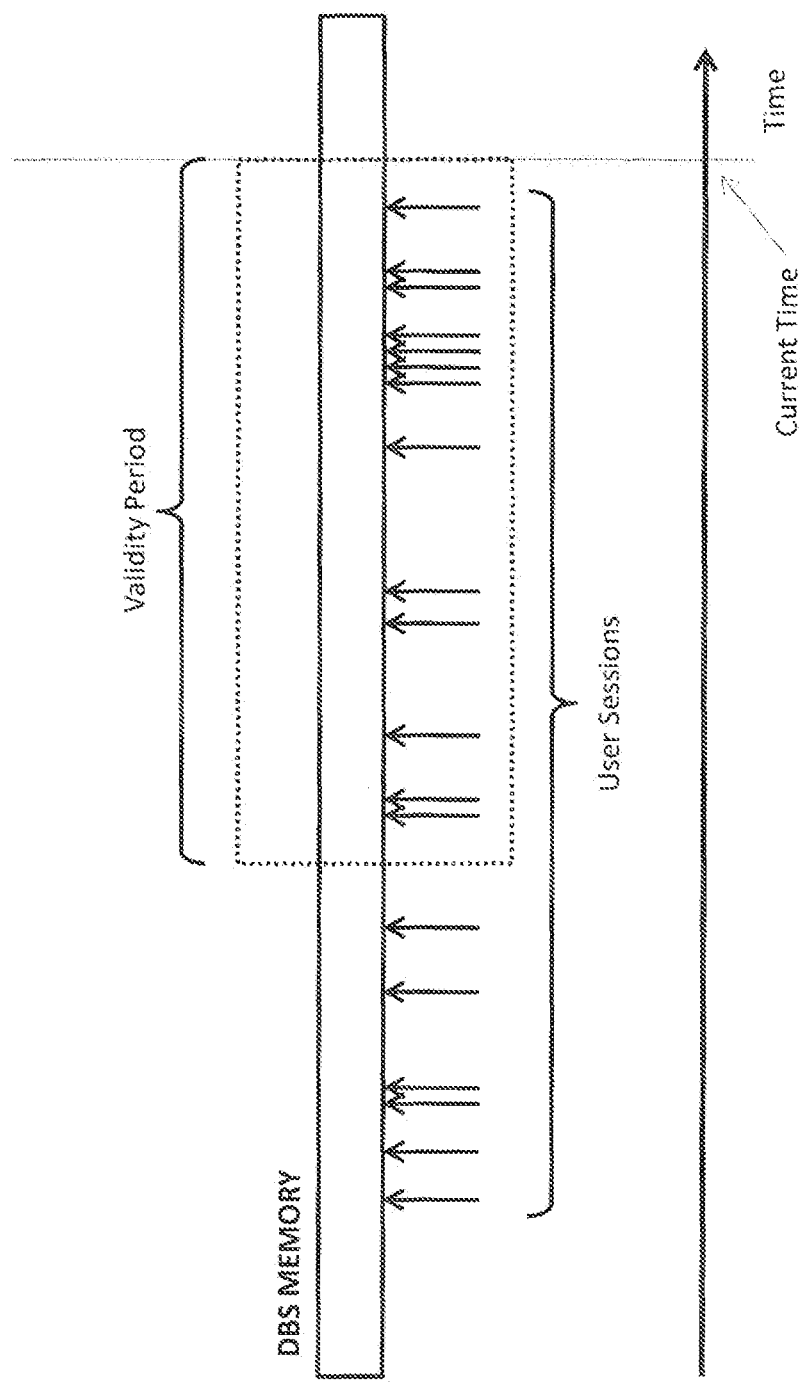
FIG. 4 shows schematically a plurality of user inputs to the memory of the system of FIG. 1 over time.

The respondent input process described above is depicted in FIG. 4, wherein the horizontal axis represents a real-time scale and RIS sessions are depicted as vertical arrows representing access of respondents to the DBS. The magnitude of a typical validity period is also depicted in FIG. 4, encompassing a portion of all depicted sessions, as it is usually the case in any implementation of the method. Different validity periods can be applied to respondent's data inputs on different respective subject matters. Subject matters may be of various kinds and can be grouped in classes so that respective validity periods are set for each type of subject matter class, consistently with experience regarding the likely persistence period observed in a number of users for each class. Absolute validity periods which expire at a predefined date and time can also be used depending on the type and characteristics of the subject matter under study. For example, a certain subject matter that has a direct link to a given upcoming event may expire (i.e. cease to make sense) after such event has actually occurred. Validity periods may also be assigned to each particular data input directly by respondents at the time the data input is performed, and according the individuals' own assessment regarding the expected validity period of the entered position. In other words, the data input made by respondents may include, not only the required opinion value, but an assessment of the time period during which the respondent expects the selection to be still representative of his or her attitude regarding the subject matter. This tends to reduce the churn rate within respondents—i.e. the rate at which respondents drop out of the survey and have to be replaced— due to a reduction in requirements, albeit at some possible cost in overall accuracy given by eventual lack of representativeness of some selections.

Regardless of the methodology chosen in terms of how the validity period of each data input may be determined, only data inputs that are still in their respective validity periods are considered for any calculation performed by the SPS, so that the resulting Collective Opinion Values (Cove's) reflect as accurately as possible the current position of the public as a whole. The SPS selects at each iteration a set of valid data inputs according to the validity period associated to each data input in relation to the real-time point associated to the current iteration. For consistency, if more than one response from the same respondent can be found within the corresponding validity period, then only the latest one must be considered by the SPS.

The system can be programmed to actively encourage user input at particular points in time. The act of encouragement can include issuing an automatic notification to the user, via for example email or SMS, to notify them that a previous position that they have input with respective particular subject matter is about to expire. Respondents may also be offered a summary page where all positions about to expire are listed, so that action can be taken easily by respondents to update their selections. Upon being notified by the system that a given position is about to expire, respondents are encouraged to log in their respective accounts through the RIS to ratify or modify their opinion values as appropriate, so that their positions are updated accordingly, keeping the values as representative as possible of their respective respondents' current views and attitudes. Absence of any action is construed as no modification in the respective respondent's opinion as long as the respective stored position is still within its validity period.

Figure 5:
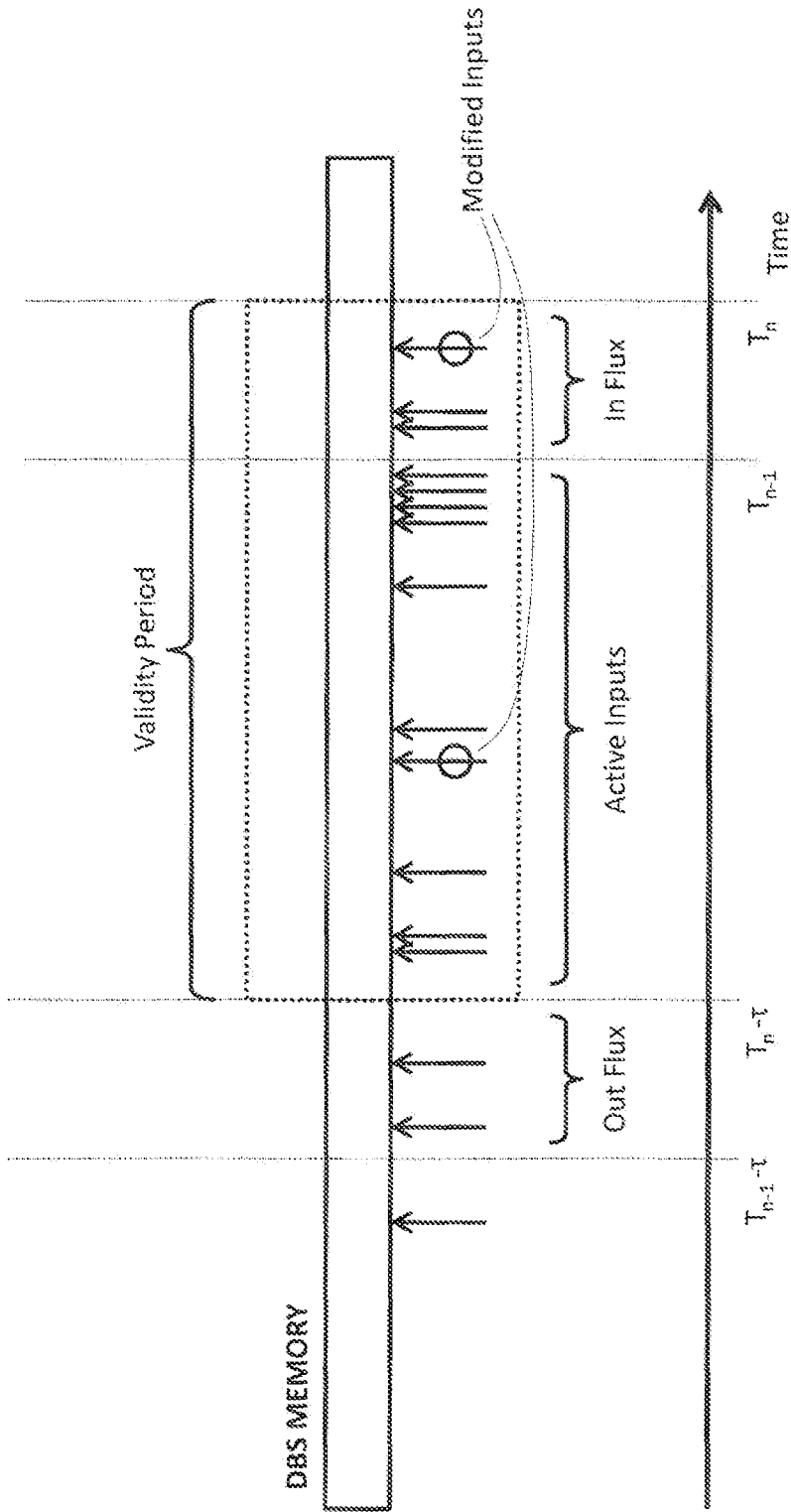
FIG. 5 shows schematically the treatment of user inputs over time for calculation of statistics using the system of claim 1.

Hence, the present methods and system operate on continuous inward and outward flows of survey data that enter or exit the calculation time-frame considered by the SPS, which enables the generation of quasi-continuous opinion data, and in real time if desired. This is depicted in FIG. 5. The SPS must at any one time consider inward and outward flows of data as well as stationary relevant data in order to obtain a consistent subset of valid data inputs on each iteration. The inward flow "In Flux" considered by the SPS comprises selections made by new respondents that join the survey as well as updated selections made by respondents that declare new opinion values respect to previous responses, exemplified in FIG. 5 by a circle around corresponding sessions. The SPS is programmed to disregard any previous data input from a given respondent if a fresher data input exists from the same respondent in the DBS to avoid duplication.

The outward flow ("Out Flux") considered by the SPS comprises primarily previous responses that exit the calculation time-frame such as opinion values that have expired before being refreshed. Respondents that may have opted for quitting the survey must be included as well in Flux, although such number will be comparatively low respect to the average number of users usually observed joining a survey for the first time, updating their data input or letting their record expire unchanged. This is largely because all users who decide to quit the survey can do it by simply not refreshing their respective positions, so that they eventually expire.

The rest of the data inputs taken into account by the SPS are those that are within their validity period and that have not been recently refreshed so are stationary but relevant ("Active Inputs"). This last group usually comprises the vast majority of the inputs contributing to the aggregated figures calculated by the SPS between any given successive iterations.

Therefore, the variations in the aggregated figures calculated by the system are derived from the shares for each possible opinion value observable in each of the above mentioned inward and outward data flows, in comparison with the same shares found in the Active Inputs. This makes the method especially apt to generate statistical data about variations in opinion data as opposed to successive absolute figures.

Figure 6:
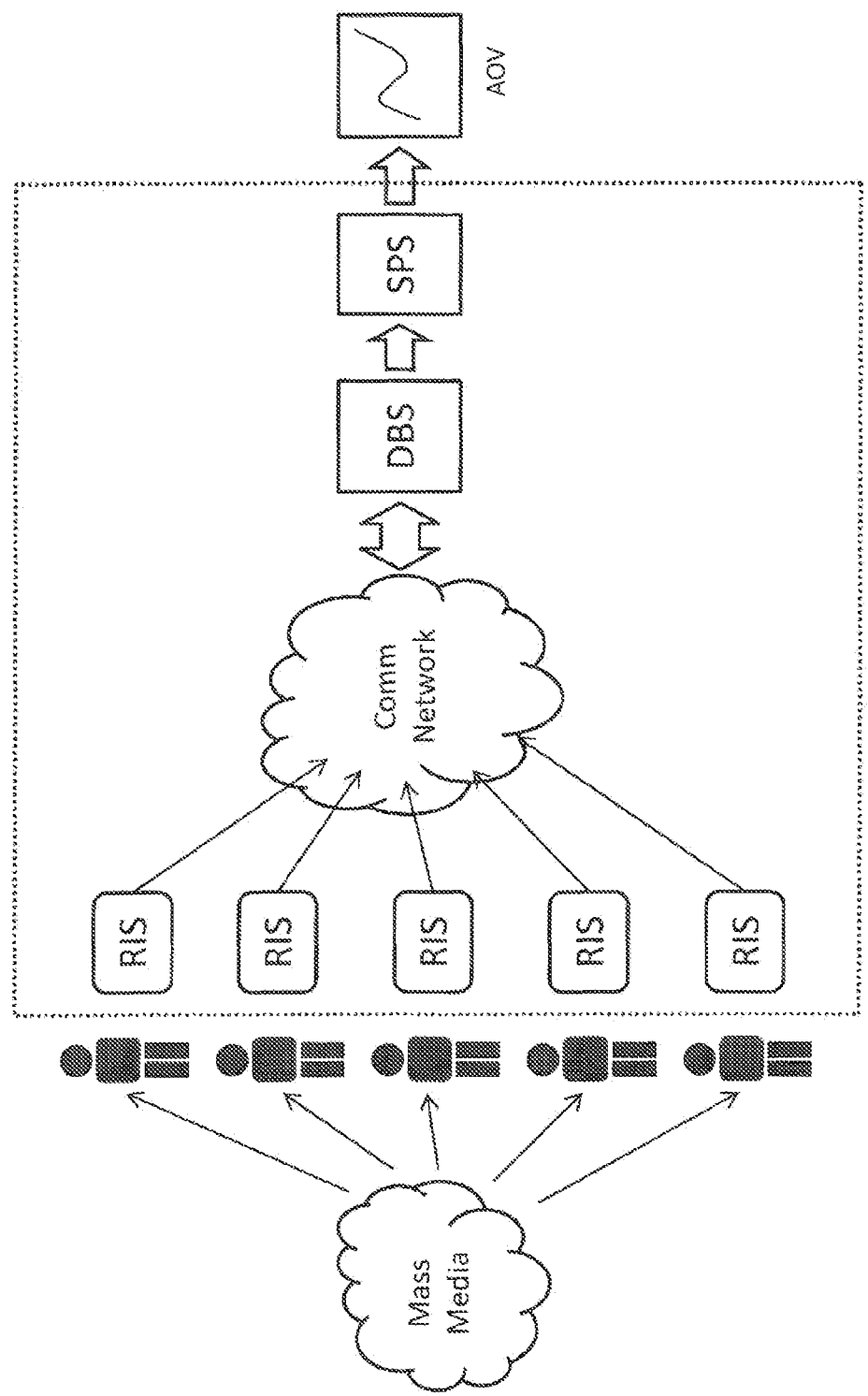
FIG. 6 shows schematically the potential effect of a mass media event on user inputs to the system of FIG. 1.

In operation, the SPS recalculates all statistical figures representing user-input values on all subject matters under study on a periodic basis preferably at a fast pace, e.g. on a hourly basis. Thus, any relevant external circumstances, such as news that may produce a change in public attitudes, gets reflected in the flow of respondents that access the system to state their positions or modify previous ones, which in turn reflects a net change in the collective opinion values representing user positions such as public opinion or attitude respect to the corresponding subject matters. This process is depicted in FIG. 6.

The SPS may be set up to calculate more than one aggregated value in each survey, as long as the RIS frontend provides a way for respondents to express their opinions accordingly. For example, a survey may be required for determining the public opinion about a policy decision to be made regarding three or more alternative mutually-exclusive courses of action. In such case the RIS frontend may allow respondents to express their chosen alternative. The SPS processes them in a similar fashion as explained above, but for all alternatives as separate values, which become aggregated shares associated to each of the alternatives. Such a survey could comprise—by way of example—a question about an appropriate course of action including three options "A", "B" and "C". In such cases the SPS recalculates aggregated figures for all three values on every iteration, thus providing the shares of each alternative in quasi-real time as explained above. It should be apparent to those skilled in the art that the number of choices offered to a respondent in this type of embodiment is in principle unlimited, as long as it comprises at least two alternatives.

Statistical Projection

The process of generating the COV within the SPS preferably includes a weighting engine that assigns weights to individual opinion values according to universe data to correct for inevitable imbalances in the composition of the sample, which may vary between successive iterations of the SPS calculation. In fact, the set of respondents is derived from a set comprising all valid inputs, which is a function of time, as explained above. Once the set of valid inputs and their respective respondents have been identified by the SPS, it assigns different weights to each respondent in order to reflect as accurately as possible the demographic composition of the universe. Several well-known weighting methods exist that can be used for this purpose. The most frequently used are weighting by cell and Iterative Proportional Fitting (IPF). For example, a Cell Weighting method as described in handbooks on statistical sampling for instance *Cochran, Sampling Techniques, Wiley*, 3rd edition uses the segmentation of the population into a certain number of strata (cells) based on a natural segmentation or criterion such as genre or geographical area, or obtained by crossing two or more natural segmentations. Other viable methods exist, for example Iterative Proportional Fitting (IPF) which weighs the respondents of the sample using only marginal distributions of various segments as opposed to crossed distribution. As the name implies, the procedure consists in an iterative process to fit the structure of the sample to the structure of the population by successive proportional adjustments. IPF is widely employed in sample research.

The structural aspects of System 110 and its operation make it possible for the elementary data to be projected to the universe by any known method. Those skilled in the art will recognize other possible viable methods for improving the representativeness of the set of respondents.

In its simplest possible implementation, the calculation performed by the SPS can be expressed in general terms as follows:

$$COV_{(n)} = (\Sigma_{1-m} OV_{(i)})/m \quad \text{Eq. 1}$$

Where:
$COV_{(n)}$ is the calculated Collective Opinion Value produced by the $n^{th}$ iteration of the SPS process;
$OV_{(i)}$ represents all valid opinion values (i.e. within validity period) available in the DBS at run time; and,
m is the total number of valid opinion values within the calculation time-frame at the $n^{th}$ iteration.

If any weighting mechanism is used for balancing the sample, the calculation that may be performed by the SPS can be expressed as follows:

$$COV_{(n)} = (\Sigma_{1-m} OV_{(i)} * W_i)/\Sigma W_i \quad \text{Eq. 2}$$

Where:
$COV_{(n)}$ is the calculated Collective Opinion Value produced by the $n^{th}$ iteration of the SPS process;
$OV_{(i)}$ represents all valid opinion values (i.e. within validity period) available in the DBS at run time; and,
$W_i$ the weight assigned to each respondent (as calculated through the chosen weighting mechanism).

Figure 7:
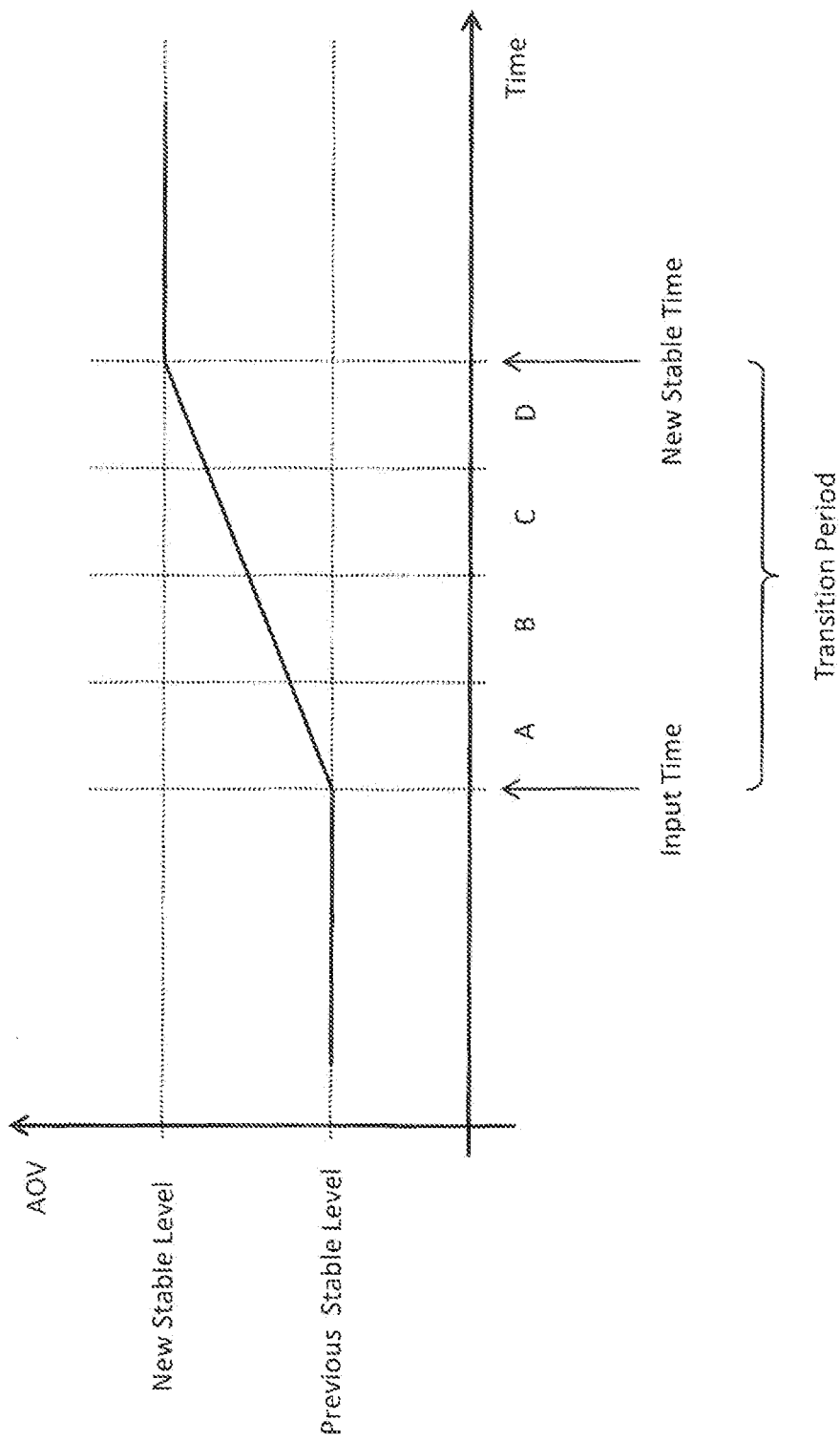
FIG. 7 shows an example of variation in collective opinion value (COV) over time during use of the system of FIG. 1.

One advantage of the present system and its methods of operation is the responsiveness with which it can capture trends in the public's attitude respect to new events in the news. FIG. 7 depicts a possible situation where certain news provokes a positive shift in public attitude respect to a given subject matter. "Input Time" in FIG. 7 is defined as the time at which certain relevant events happen or become known to the public through news distribution channels. It is assumed—for the purpose of this explanation—that the public's attitude rises to a new stable level at a later point in time, which is depicted in FIG. 7 as "New Stable Time". Between the points "New Input" and "New Stable Time" the COV will vary upwards until it reaches "New Level". The time elapsed between "New Input" and "New Stable Time" is called the "Transition Period" and is divided in four segments A, B, C and 'D' in FIG. 7 for the purpose of this explanation.

As explained above, at "New Input" time some relevant event happens and become known to the public through available news distribution channels. Some respondents may react immediately, mostly if they happen to be accessing their records through the RIS at the time at which the news break. Some other respondents may take longer to react, while some respondents may not react at all, either because they do not feel the news would change their position already taken about the subject matter, or because they are not perfectly compliant in their role within the survey.

In any case, because there is no correlation a priori between the particular position that a given respondent may take respect to a given subject matter and the time at which that same respondent will refresh his or her records as these two processes are completely independent of one another, the sign of the shift in public opinion and to a certain extent its magnitude as well is detectable in the same way in each of the four segments depicted in FIG. 7 or in any segment defined by any arbitrary division of the Transition Period for that matter. This is because each segment is—in principle—equivalent to any other in the sampling process realized by the system, except for the volume of user accesses may vary over time depending on a number of factors, as explained below.

In other words, each segment of the Transition Period embodies a sampling process in itself in the context of sampling variations in opinion values. Therefore the sampled variable for any subject matter at any given time during operation of the present system can expected to exhibit substantially the same balance of positive shifts and negative shifts during the entire Transition Period, since the balance itself has no detectable relation to the time at which those opinions are refreshed in the system's database. Thus, the trend of the COV figure as it evolves from "Previous Stable Level" towards "New Stable Level" is detectable immediately already at stage 'A' in FIG. 7 because the response time or even compliance level of any given respondent can be assumed to be independent of the particular position which that same respondent may take respect to any particular subject matter. Therefore a substantially similar distribution of positive vs. negative attitudes respect to the subject matter under study to produce the COV shown in FIG. 7 can be expected at any of the stages 'A', 'B', 'C' or 'D'. This means in turn that the trend of the shift in public opinion can be detected with similar accuracy in any of the stages in the same way (if taken independently).

Figure 8:
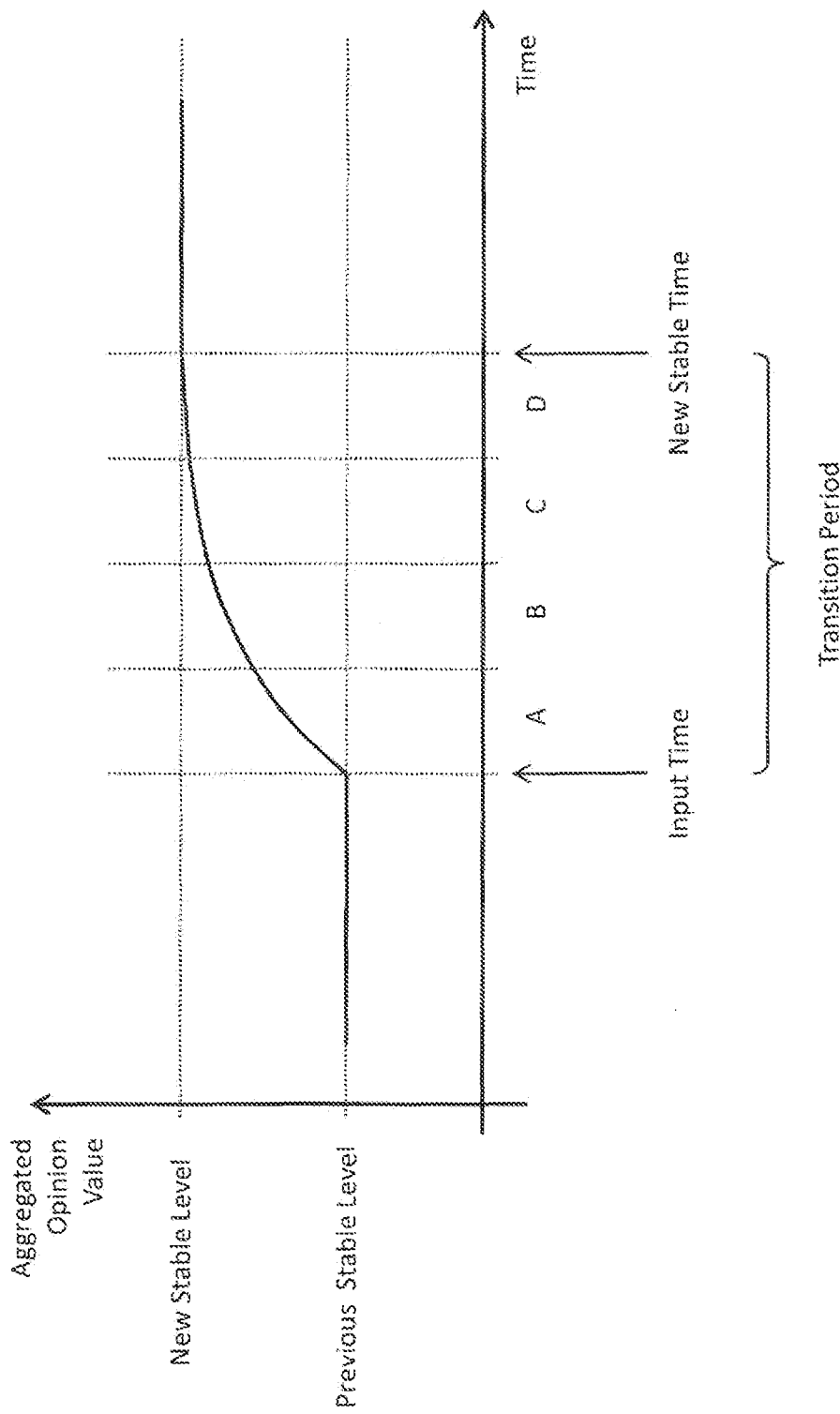
FIG. 8 shows a different possible variation of COV over time using the system of FIG. 1.

On the other hand, the curve profile describing the measured shift in public opinion from "Previous Stable Level" to "New Stable Level" depends on the access volume profile, i.e. the number of respondents accessing the system at any given time, over time which may actually vary according to cultural, technological and even environmental factors. This is because respondents from some cultures may be more responsive than the average, which would produce a relatively high access rate at the beginning of the curve, which in turn makes the curve trend faster toward the "New Stable Level" which could be either higher or lower than "Previous Stable Level". FIG. 8 depicts the shape the curve may take in such case.

Figure 9:
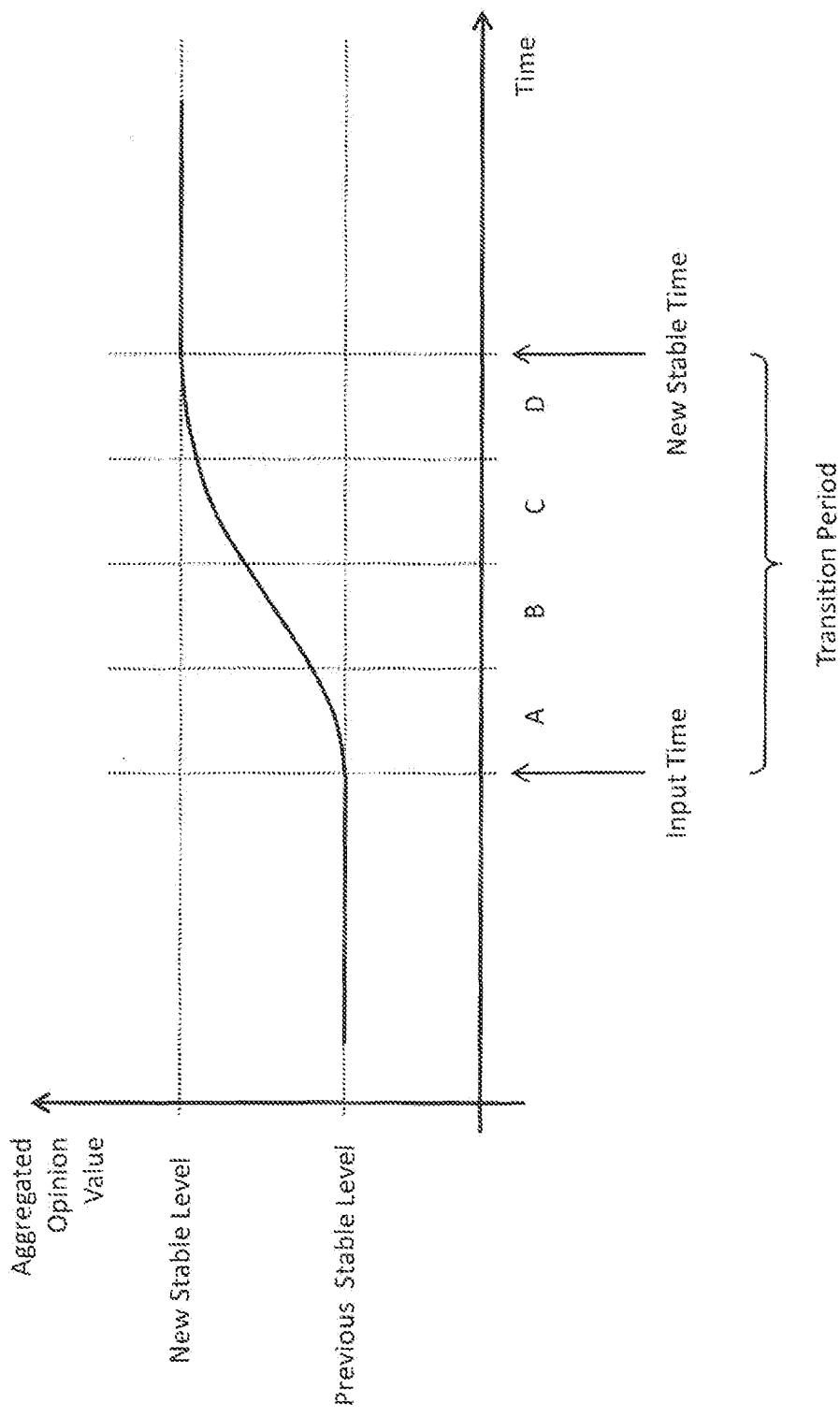
FIG. 9 shows another possible variation of COV over time using the system of claim 1.

Other situations are also possible, for example where respondents tend to act on average with longer response times, which may lead to a concentration of the accesses towards the middle of the transition period, rendering a curve profile closer to the one depicted in FIG. 9.

The actual length of the Transition Period may also be longer or shorter for the same reasons. If the shape of the curve is known by experience in the same environment, then even the final "New Stable Level" can be projected with some accuracy shortly after the Input Time. Those skilled in the art of statistical sampling will recognize that, the larger the number of respondents participating, the clearer such trends will appear early in the COV charts.

Figure 10:
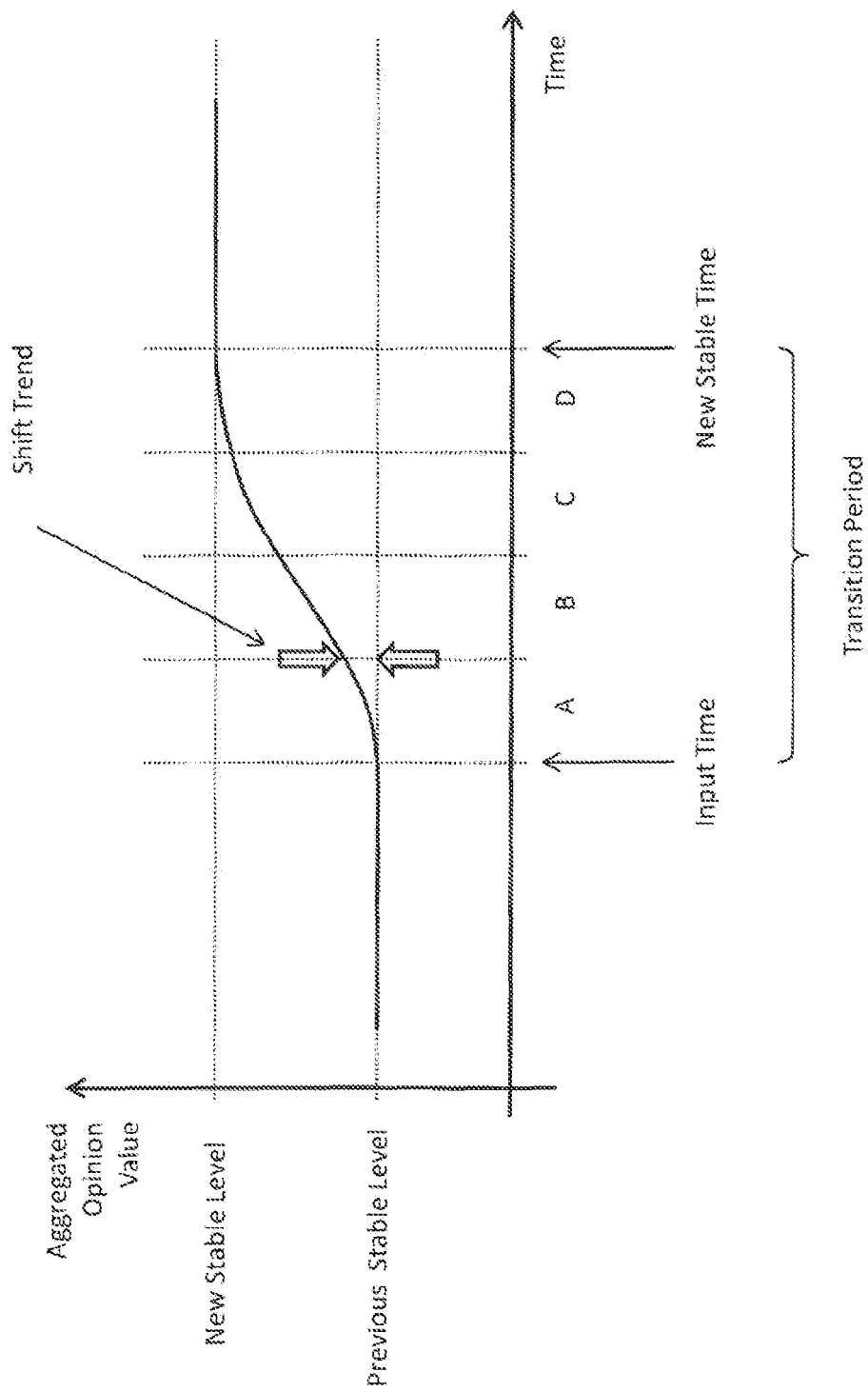
FIG. 10 shows a shift in trend that can be observed from the variation of COV over time as shown in FIG. 9.

In summary, regardless of the actual shape the curve in FIG. 7, 8 or 9 take, the rate of positive vs. negative reactions and therefore the up-down trend of the shift in public opinion can be inferred from the trend observable in the early segments of the Transition Period as depicted in FIG. 10. The same is true regarding the magnitude of the final shift if the environment is known well enough so that the reaction times of respondents can be estimated in advance. The present system can be programmed to apply intelligence to survey results over time. Therefore, as described in the example above with respect to FIGS. 7, 8 and 9, the SPS 140 may be able to predict the variation in collective opinion value (COV) in a survey on a particular subject matter in response to an external event or circumstance based on previous surveys relating to similar subject matters and/or similar circumstances or events. In particular it may look at the number of respondents who have amended their positions within a predetermined time period after a particular event or change in circumstance and extrapolate from that whether or to what extent other respondents are also likely to change their positions over time. Therefore the SPS can, for example, be programmed to estimate the time at which a "New Stable Level" can be expected in the COV after a transition from a "Previous Stable Level". It may also predict the magnitude of the "New Stable Level" either in absolute terms or relative to the "Previous Stable Level".

Numerical Example

A numerical example is set out below to further explain the structural features of the system in more detail. The following numerical example does not include a weighting phase for the sake of simplicity; therefore the COV numbers are calculated as if the sample of respondents would be perfectly balanced respect to the universe, which is only a theoretical case. However a weighting phase could be applied to this example in practice. Also even though a gradual, sliding scale for recording respondents' selections is preferred, in order to provide further granularity in the expression of opinion by respondents and in the determination of the COV, the Opinion Values are assumed to be constrained to either 1 or 0 in the example to simplify the calculation. Thus 0/1 opinion valuation allows a respondent to express full agreement/appreciation/assessment, or, total lack of it. The followings assumptions will also be used for the calculation:

Universe: 45,000,000 habitants.
Individual Opinion Values Range: 0-1
Collective Opinion Value Range: 0-100
Total Participating Respondents: 3,276 all of whom are registered in the DBS as responding to the related subject matter and holding valid positions on it.
Previous Stable Level: 68.3
Opinion Validity Period: 30 days—common to all inputs
The formula used by the SPS in this simple example is:

$$COV = (\Sigma OV_i)/N * 100 \qquad \text{Eq. 4}$$

Where $OV_i$ refers to respective individual valid opinion values stored in the data base (i.e. still in their validity period), and 'N' is the total number of such values available. Following the example, at 15:00 hours of a given day it is assumed that certain news break in the mass media landscape which reaches 3014 of the 3276 respondents i.e. circa 92% in the following 24 hours through various distribution channels. That is, 3014 "recipients" get to learn about the news by 15:00 of the next day through television, radio, Internet, etc.

Of those 3014 respondents, 210 of them feel compelled to modify their positions respect to the related subject matter; where 150 respondents i.e. circa 5% of total recipients change their assessment positively from 0 to 1 and 60 respondents i.e. circa 2% of total recipients change their assessment negatively from 1 to 0. It is also assumed that, from the 210 individuals who have changed their assessments regarding the subject matter, 189 of them i.e. circa 90% decide to access their records in the DBS to reflect their new positions, while the remaining 21 respondents do not update their positions either because they are not compliant, or because they have a problem to access the system, or they forget to do so. Because there is no a-priori correlation between the new positions taken by each individual respect to the subject matter and the fact that they do or do not access their records, the share of positive vs. negative attitudes respect to the news can be expected to be reflected fairly within the set of compliant respondents. This means that, from those 189 individuals, one can expect a distribution of 135 positive changes from 0 to 1 and 54 negative changes from 1 to 0.

In such circumstances and after the 24 hour period, the net change in the total count of positive opinions vs. negative ones is then 135−54=81, which gets reflected as a change in the COV figure of (81/3276)*100=2.47, thus increasing to 70.77 i.e. +3.6%.

Within all those respondents that have not reacted to the news, some of them have taken no action. As explained above, this may be primarily because of three reasons: 1) the respondents have not learned about the news, therefore there is no reason to modify their respective positions; 2) the respondents have learned about the news but it does not modify their previous respective assessments; and, 3) the respondents have taken no action because of non-compliance issues. It is important to note that the first reason does not configure a problem since it measures the overall reach of mass media system in the measured population. In other words, it would not be consistent to alert such respondents about the news, since their "natural" opinion is a function of the actual awareness they have about the relevant news. The second reason is not a problem either, since it is part of what the system attempts to capture. A number of alternative actions can be taken to estimate the deviation caused by the third reason. For example, an email can be sent to those respondents that have not reacted alerting them of the news, asking them if they were already aware of it before receiving the email and using their response to estimate the proportion of respondents that have actually been non-compliant respect to those which have decided not to modify their positions rightly.

Eventually, after some time following the Input Time, a new stable value of COV is reached when/if all remaining respondents have reacted, in which case:

1) 7% of respondents i.e. circa 229 respondents have changed their positions respect to the relevant subject matter, very likely in the same proportion as before i.e. 5% positively and 2% negatively, which corresponds to 164 and 65 respondents, respectively.

2) Such action would produce a net positive increment of 99 positive opinion values, which gets reflected as a change in the COV figure of (99/3276)*100=3.02, thus rising to 71.32 i.e. +4.42%.

Thus the present system and its methods of operation have been used in this example to measure and output a representation of the change in public opinion on a particular subject matter in response to a particular external event. This system has achieved this according to the present example without conducting a new survey per se and without having to actively reach out to potential respondents, except perhaps to contact certain previous respondents who have taken no action in response to the external event due to non-compliance in the survey. Instead, by recognizing the persistence characteristic of opinions and combining this with offering the users, i.e. the respondents, the capability to modify their input to the survey on an ongoing basis, true variation in public opinion or positions on any particular matter can be accurately reflected on a quasi real time basis, and in an efficient and computationally non-intensive manner.

It is useful to compare the kind of effort that measurement carried out according to this numerical example would require if conventional research methods were used instead of the present system. In such case, a panel could not be used realistically because such an approach would require asking the same set of questions on a daily basis to the same group of individuals, which would churn out the panel immediately. Therefore the only solution would be repeating the same question periodically to a number of individuals drafted randomly from the population, possibly by random phone calls or other well known methods.

The sampling error i.e. standard deviation of such type of research using a 95% confidence level can be calculated using Eq. 5:

$$\epsilon = (1/p) * SQRT((p.(1-p)/n) \quad \text{Eq. 5:}$$

In order to measure effectively a variation of circa 5% in the public's attitude, it could be argued that a sampling error one order of magnitude lower should be reasonably required in order to provide some meaningful variation figure.

In such a case, the number of respondents to be contacted by phone on a daily basis should be circa n=18500 (from Eq. 1, using $\epsilon$=0.005 and p=0.683).

It can be seen from the above example that measuring variations in the same range of public opinion using conventional methods would require inquiring more than 18000 individuals on a daily basis in order for a sampling error as low as 0.5% can be achieved. This falls outside of any realistic economic possibility for most subject matters, except possibly for a few matters of national interest, as for example the approval rating of a president.

On the other hand, the present system is structurally capable of capturing variations in opinion ("$\Delta_{COV}$") since any biases or sampling errors incurred when capturing $COV_{(n)}$ are also active when capturing $COV_{(n+1)}$ and affect their values in a similar proportion and direction. Therefore the measurement of $\Delta_{COV}$ is much less affected by such potential biases or sampling noises, leaving only the sampling noise introduced when capturing the variation itself, i.e. "$\Delta_{COV}$".

As can be seen from the above numerical example, shifts of public opinion can be easily detected using the present system. The marginal cost of creating and running such a system is virtually insignificant as compared to those incurred using conventional methods and systems.

The availability of quasi real-time opinion data is an unprecedented feature of social organizations and it is expected to have a significant impact on the way opinions are observed and analyzed, opening new opportunities for improvement in a wide range of communication processes, spanning fields from conventional marketing to media broadcasting and political marketing.

Variations

While the COV is described herein as a weighted average of the set of valid inputs at each iteration of the SPS, it will be appreciated that the COV can be derived in an arbitrary number of ways from the set of valid data inputs. For example, a transformation may be implemented before adding up the individual opinion values to zoom in on any particular area of the output index's range, or a transformation can be applied after the adding operation to provide a different behaviour to the output index (e.g. logarithmic).

In some cases, even "non-statistical" weighting methods may be used for generating a specific type of COV series, depending on the particular application of the system. By way of example, an expert-only sample may be set up for assessing the likelihood of some future events or the impact of a certain policy decision, where expert respondents are further weighted according to their respective level of expertise in a given subject matter.

In general, it will be appreciated that the aggregation process for generating a COV series may include any type of transformation or combination of the available set of valid data inputs as long as it provides a meaningful indication of collective opinion that is not impaired by a varying set of valid data inputs.

Whilst this description focuses on measuring changes in public opinion in the examples described herein, it will be appreciated that the present system and methods could be used to measure changes over time in a wide range of user-provided selection data. Furthermore, the system can be programmed to correlate user input selection values to a wide range of different external events, circumstances or other information. Therefore the system could be used for example to measure public perception regarding future demand for a particular commodity or product in correlation with changes in an external circumstance such as availability of particular resources, or any other external variable.

Whilst FIG. 1 shows a system having five RSI user interfaces, it will be appreciated that any number of users may access this system via any reasonable number or types of interface between the memory and processing aspect of the system and the user. Preferably the user communicates with a graphical interface but a text and/or audio interface could be used.

In FIG. 1 the memory means within the system is represented by a database subsystem (DBS) which is programmed to store information about respondents in separate compartments including both information inherent to each respondent and also information regarding the votes that they cast using the system. However any suitable memory means may be used. Separate memories may be used for user information and input information respectively. However these must be correlatable in some way so that the system recognises when a particular user updates his or her vote on a particular subject matter. Alternatively or additionally there may be multiple memory means including a back up memory and/or an archive for storing out of date vote and/or respondent information.

The processing means in FIG. 1 is represented by a statistical projection subsystem (SPS) which is capable of carrying out statistical calculations based on user selections input to the system and to generate figures representing the changes in that user input information. It will be appreciated that any appropriate processing means may be used within the present system for carrying out these tasks. For example some processing may be conducted locally at the CPU of a computer at which a user inputs a new selection or change thereof. Alternatively or additionally there may be a central processing means which processes inputs from a plurality of users. The processing means may be compartmentalized in any suitable manner.

The outputs of the system are shown in FIGS. 7 to 10 as taking the form of graphs showing the change of collective opinion value (COV) over time. The system may be programmed to output other types of results in addition to or as an alternative to such graphs. For example it may output text reports of variation in COV or other user selections or preferences over time for one or more subject matters. Alternatively or additionally it may output audible results and/or other types of graphical results such as pie charts or three dimensional plots as appropriate to the particular subject matter under survey.

The invention claimed is:

1. A system for detecting statistical variations in public opinion comprising:
a plurality of response interfaces for capturing opinion values of a set of respondents in relation to a subject matter, each opinion value having a respective validity period associated therewith;
a database in communication with the plurality of response interfaces, the database including a plurality of data structures for storing each opinion value corresponding to each respondent and to said subject matter;

a statistical processing unit in communication with the database for calculating an opinion output from subsets of each opinion value according to each respective validity period.

2. The system of claim 1 wherein the statistical processing unit is adapted for calculating the opinion output over corresponding subsets of each respective opinion value.

3. The system of claim 1 wherein the statistical processing unit is adapted for calculating successive values associated with the opinion output.

4. The system of claim 3 wherein statistical processing unit is adapted to calculate successive values of the opinion output substantially in quasi-real time.

5. The system of claim 1 wherein said respective validity periods are predefined values.

6. The system of claim 1 wherein said respective validity periods are defined by the respective respondent.

7. The system of claim 1 wherein the opinion output is selected from a grouping consisting of: an agreement with a statement, a disagreement with a statement, a selection of an option from a plurality of options, a prediction, an approval of an individual, a disapproval of an individual, a request, an expectation, or a requirement.

8. The system of claim 1 wherein the statistical processing unit includes a weighting engine for assigning weights to the opinion values.

9. A method of generating statistical data representing respondent selections, comprising:

receiving data inputs at a plurality of response interfaces from a plurality of respondents representing a respondent selection;

storing the data inputs from the plurality of respondents;

determining a validity time period associated with each of the data inputs;

receiving an updated data input at at least one of the plurality of response interfaces from a respondent representing said respondent's selection;

storing at least one of the stored data inputs to include the updated data input provided by the at least one of the plurality of respondents;

determining a set of valid data inputs according to the respective associated validity time periods;

aggregating the set of valid data inputs for deriving a respective value of at least one index; and deriving a succession of corresponding values of the at least one index.

10. The method of claim 9 wherein said deriving of a succession of corresponding values of said index is in quasi-real time.

11. The method of claim 9 further comprising filtering the set of valid data inputs with an updated data input.

12. The method of claim 9 further comprising determining the validity time period for a data input based on a group consisting of: a type of related subject matter, an input time of said data input, an identity of the user providing said data input, composition of the data input, or a respondent selection.

13. The method of claim 12 wherein the respondent selection is based on a group consisting of: a level of agreement with a statement, a selection of an option from a plurality of options, an assessment of likelihood of a future event, a level of approval of the respondent, or a performance metric.

14. The method of claim 9 further comprising applying a weighting factor to the set of value data inputs.

* * * * *